United States Patent
Hursey et al.

(10) Patent No.: US 7,340,774 B2
(45) Date of Patent: Mar. 4, 2008

(54) MALWARE SCANNING AS A LOW PRIORITY TASK

(75) Inventors: Neil John Hursey, Hertfordshire (GB); William Alexander McEwan, Bedfordshire (GB)

(73) Assignee: McAfee, Inc., Santa Clara, CA (US)

( * ) Notice: Subject to any disclaimer, the term of this patent is extended or adjusted under 35 U.S.C. 154(b) by 1224 days.

(21) Appl. No.: 09/975,991

(22) Filed: Oct. 15, 2001

(65) Prior Publication Data
US 2003/0074574 A1 Apr. 17, 2003

(51) Int. Cl.
*G06F 11/00* (2006.01)

(52) U.S. Cl. .................. 726/22; 726/23; 726/24; 726/25; 713/188; 709/224; 709/229

(58) Field of Classification Search ........ 713/200–202, 713/188; 714/38; 726/22–25; 709/201, 709/224, 227, 229; 718/12–13
See application file for complete search history.

(56) References Cited

U.S. PATENT DOCUMENTS

| | | | | |
|---|---|---|---|---|
| 5,440,723 A | * | 8/1995 | Arnold et al. | 714/2 |
| 5,502,815 A | * | 3/1996 | Cozza | 714/38 |
| 5,613,002 A | * | 3/1997 | Kephart et al. | 726/24 |
| 5,832,208 A | * | 11/1998 | Chen et al. | 726/24 |
| 6,094,731 A | * | 7/2000 | Waldin et al. | 714/38 |
| 6,721,721 B1 | * | 4/2004 | Bates et al. | 707/1 |
| 6,735,700 B1 | * | 5/2004 | Flint et al. | 726/24 |
| 6,772,346 B1 | * | 8/2004 | Chess et al. | 713/201 |
| 6,836,860 B2 | * | 12/2004 | Muttik et al. | 714/38 |
| 6,851,057 B1 | * | 2/2005 | Nachenberg | 713/200 |
| 6,892,303 B2 | * | 5/2005 | Le Pennec et al. | 713/188 |
| 2002/0143850 A1 | * | 10/2002 | Caronni et al. | 709/201 |
| 2004/0010703 A1 | * | 1/2004 | Kouznetsov et al. | 713/200 |

OTHER PUBLICATIONS

Cochran "Inside the Exchange Server Antivirus API" Sep. 7, 2001.*

* cited by examiner

*Primary Examiner*—Kim Vu
*Assistant Examiner*—Baotran N. To
(74) *Attorney, Agent, or Firm*—Zilka-Kotab, PC; Christopher J. Hamaty

(57) ABSTRACT

A malware scanner 2 operates as a low priority task within a multi-tasking environment. A pending scan database 14 is maintained storing details of computer files that have been written to a data storage device 6, but have not yet been scanned. The scanner 2 operates to subsequently scan these computer files for malware at which point they are removed from the pending scan database 14 and added to the scanned file database 16.

26 Claims, 5 Drawing Sheets

FIG. 2 ACCESS REQUEST SERVICING

BACKGROUND SCANNING   *FIG. 3*

STARTUP FIG. 4

MALWARE SCANNING AS A LOW PRIORITY TASK

BACKGROUND OF THE INVENTION

1. Field of the Invention

This invention relates to the field of data processing systems. More particularly, this invention relates to malware scanning within data processing systems, such as scanning for computer viruses, Trojans, banned computer files and banned content.

2. Description of the Prior Art

It is known to provide malware scanners that read stored computer files and compare those files with data defining known types of malware to see if the computer files contain such malware. Such scanners can operate in an on-demand mode where all the files upon a storage device, or a specified group of such files, are scanned for malware one after the other as a unitary task. Such on-demand scans can take many hours to run. As the volume of data being stored on storage devices increases and the number of malware threats also increases, the amount of processing associated with such on-demand scans is also rapidly increasing such that the time taken to conduct such on-demand scans often exceeds the idle time available, such as an overnight or over-weekend period. Another type of scan is an on-access scan which operates to scan a computer file for malware as it is accessed, either as it is being written to a storage device or before it is read from a storage device. While such on-access scanning is effective, it can introduce a disadvantageous extra amount of processing and consequent delay in what can be critical timing paths. In order to deal with this, on-access scanners may be configured such that files are only scanned as they are written to a storage device, but are not scanned as they are read from a storage device. However, even in these circumstances when a large number of computer files need to be written to a storage device in a short period of time, the necessary on-access scanning for malware within those computer files can introduce a significant and disadvantageous delay.

SUMMARY OF THE INVENTION

Viewed from one aspect the present invention provides a computer program product for controlling operation of a computer to detect malware, said computer program product comprising:

(i) pending scan database code operable to maintain a pending scan database storing data identifying computer files that have been written to a data storage device and for which a scan for malware has yet to be performed; and (ii) scanning code operable as a low priority task within a multitasking environment to conduct malware scanning upon computer files identified within said pending scan database.

The invention recognises that whilst a typical computer may have a high degree of utilisation for short periods of time, it will, even during use by a user in working hours, spend a significant amount of time at idle during which time malware scanning could take place. The invention exploits this by providing a database for storing details of pending scans of computer files for which a malware scan has yet to be performed such that these scans can be performed at a later time as processing resource becomes available to a low priority task within a multi-tasking environment. Thus, when a user operation may require a large number of computer files to be written to a storage device in a short period of time before they then commence further operation, the present technique allows the necessary scans of these computer files to be deferred and entered into a pending scan database to be performed later as processing resources become available within the multi-tasking environment. Thus, the performance impact upon the user of the malware scanning is reduced.

In order to deal with situations in which a read request is made for a computer file that has not yet been scanned and is included within the pending scan database, mechanisms are provided such that the computer file concerned may then be scanned as a high priority task before permitting read access to that computer file. Thus, when read access is required to a computer file within the pending scan database, that computer file may be pulled out of the queue of pending scans and scanned as a high priority task in order to ensure that the computer file is checked for malware before it is used, i.e. security taking priority over speed in this circumstance. In practice, the requirement to scan a single computer file in this way is not too significant and such a scan before a read for a single file can be conducted without too great an impact upon performance.

Preferred embodiments of the invention also provide a scanned file database maintaining a record of files that have been scanned for malware. The provision of such a database allows extra security to be provided in relation to the malware scanning.

As a preferred example, the scanned file database can include checksum data relating to the scanned files such that when a read request for a computer file is received and that computer file is within the scanned file database, then the checksum can be recalculated for the computer file and compared against that derived when the computer file was scanned in order to ensure that the computer file has not been modified in the intervening period, as this would necessitate a rescan.

In preferred embodiments, upon initialisation/startup the system operates to detect any computer files stored on a specified storage device not included within either the pending scan database or the scanned file database such that files may be rescanned.

As well as providing a computer program product for controlling the operation of a computer to detect malware in accordance with the above described techniques, the present invention also provides a method for detecting malware and an apparatus for detecting malware as complementary aspects of the same inventive concept.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
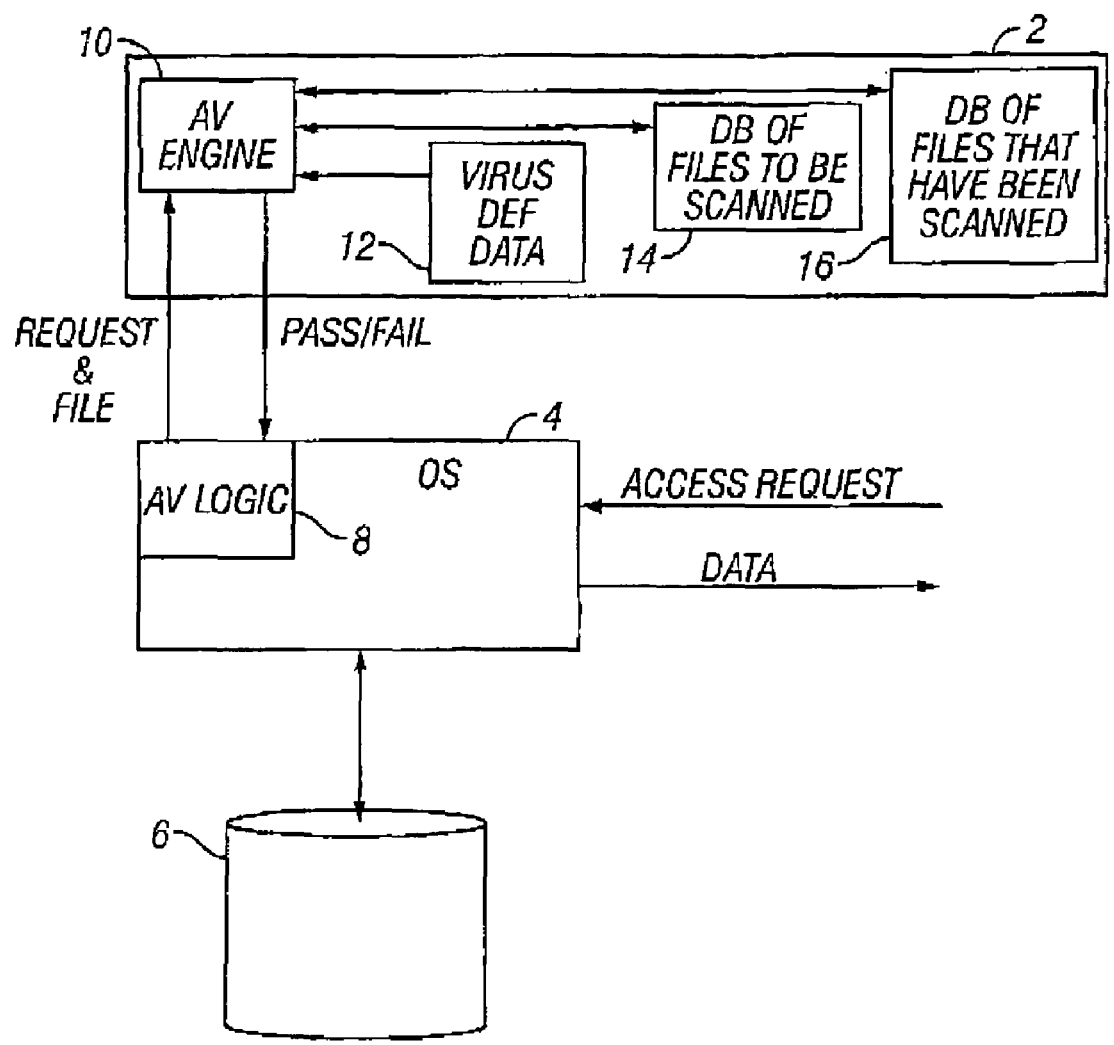
FIG. 1 schematically illustrates a malware scanner operating in conjunction with a computer operating system.

FIG. 1 schematically illustrates a malware scanning task 2 operating in conjunction with an operating system 4. The operating system 4, amongst other roles, controls file access to a data storage device 6. The operating system 4 is a multi-tasking operating system, such as is provided by Windows NT and the like produced by Microsoft Corporation. It will be appreciated that another operating system could be used instead of Windows NT.

The operating system 4 has some additional code 8 added to it that serves to intercept file access requests to computer files stored on the data storage device 6 before these are serviced. The additional code 8 redirects these requests to the scanner task 2. The scanner task 2 uses a computer program that includes anti-virus scanning engine code 10, virus definition data 12, a pending scan database 14 storing details of computer files to be scanned, a scanned file database 16 storing details of computer files that have been scanned as well as other code portions, such as code that is operated upon system initialisation. The operating system 4 passes to the scanner 2 details of the name of the computer file to which an access request is made. If that computer file is one identified in the scanned file database 16, then it may already have been scanned for malware and so be eligible to be released to the requesting process. In order to confirm that the computer file in question has not been altered since it was initially scanned, a checksum is calculated from the current version of the computer file on the data storage device 6 and this is compared to a checksum that was calculated from the version of that computer file that was scanned (as stored in the scanned file database 16). Providing these checksums match, then a pass result is sent back to the operating system 4 and the requesting process is allowed to access the file concerned. A fail would result in the file being re-scanned.

If the access request is a write request, then the computer file is written to the data storage device 6 and the scanner 2 serves to add the details of that computer file to the pending scan database 14 such that a scan of that computer file may be performed later as part of low priority and/or background processing. The anti-virus engine 10 as well as communicating with the databases 14, 16 also performs the necessary scanning as a low priority and/or background task using the supplied virus definition data 12 supplied.

Figure 2:
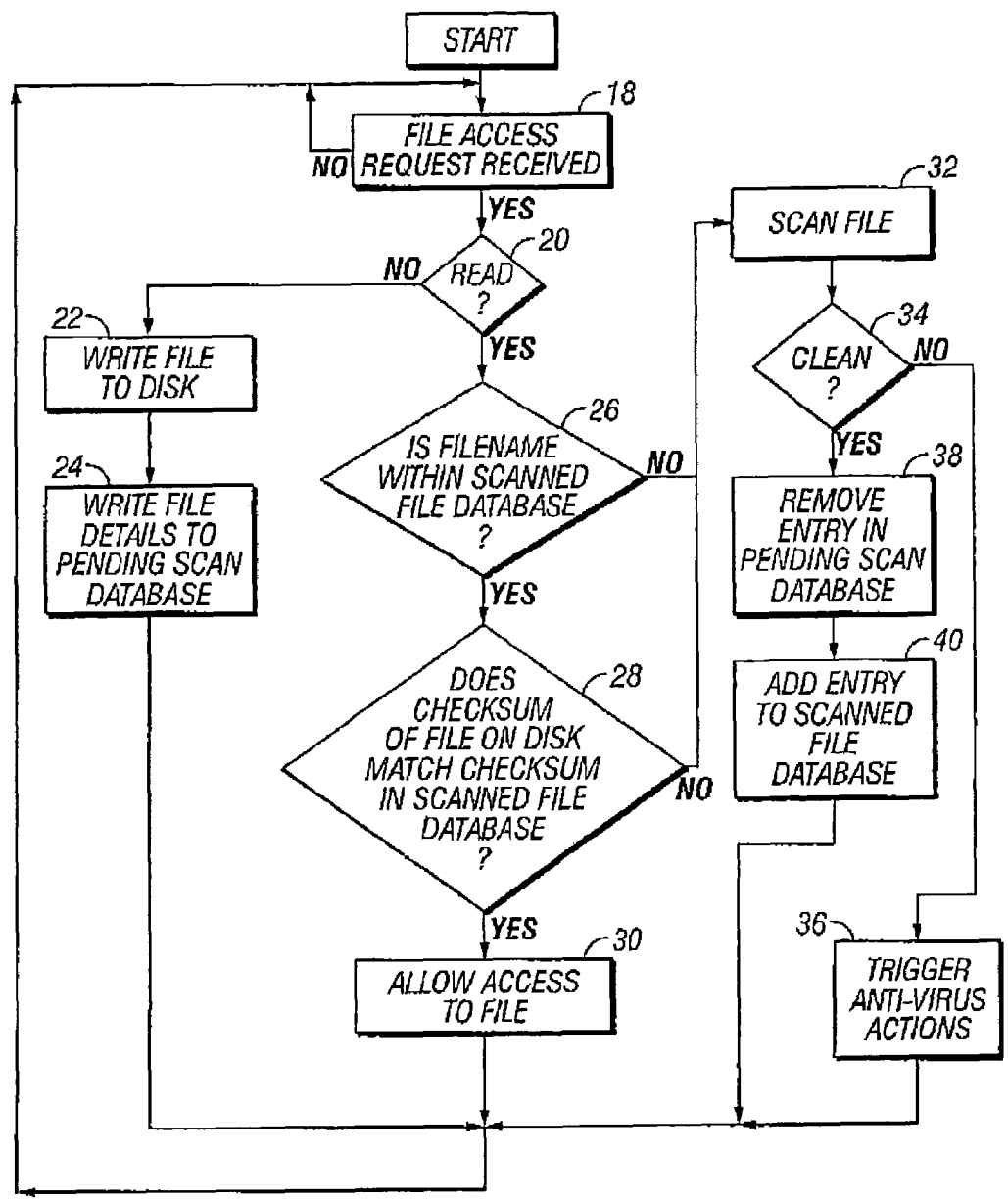
FIG. 2 is a flow diagram schematically illustrating the servicing of an access request to a computer file.

FIG. 2 is a flow diagram illustrating the servicing of a file access request. At step 18 the process waits until a file access request is received. If step 20 determines that the request is not a read request, then processing proceeds to step 22 at which the file is written to the data storage device and step 24 at which details (e.g. name, location, size, etc.) of the computer file in question are added to the pending scan database 14 before processing returns to step 18 awaiting the next file access request.

If step 20 determines that the file access request is a read request, then processing proceeds to step 26. Step 26 determines whether or not the computer file being accessed is one which is noted within the scanned file database 16 as having already been scanned. If the computer file is within the scanned file database 16, then processing proceeds to step 28 at which a checksum of the currently stored version of that computer file on the data storage device 6 is calculated and compared with a corresponding checksum calculated when that computer file was scanned. If these match, then processing proceeds to step 30 at which access to the file is allowed before processing is returned to step 18.

If the test at step 26 indicated that the computer file was not one within the scanned file database 16 or the test at step 28 indicated that the checksums did not match, then processing proceeds to step 32 at which the computer file in question is scanned as a high priority foreground task using the anti-virus scanning engine 10 and the virus definition data 12. Step 34 determines whether or not the scan indicated that the file was clean. If the file was not clean, then processing proceeds to step 36 where anti-virus actions are triggered, such as file cleaning, file quarantining, file deletion, alert message issuing etc. If the test at step 34 indicated the file was clean, then step 38 removes the entry in the pending scan database 14 corresponding to that computer file and then step 40 serves to add an entry (e.g. name, location, size, checksum etc.) to the scanned file database 16 for that file before processing again returns to step 18.

Figure 3:
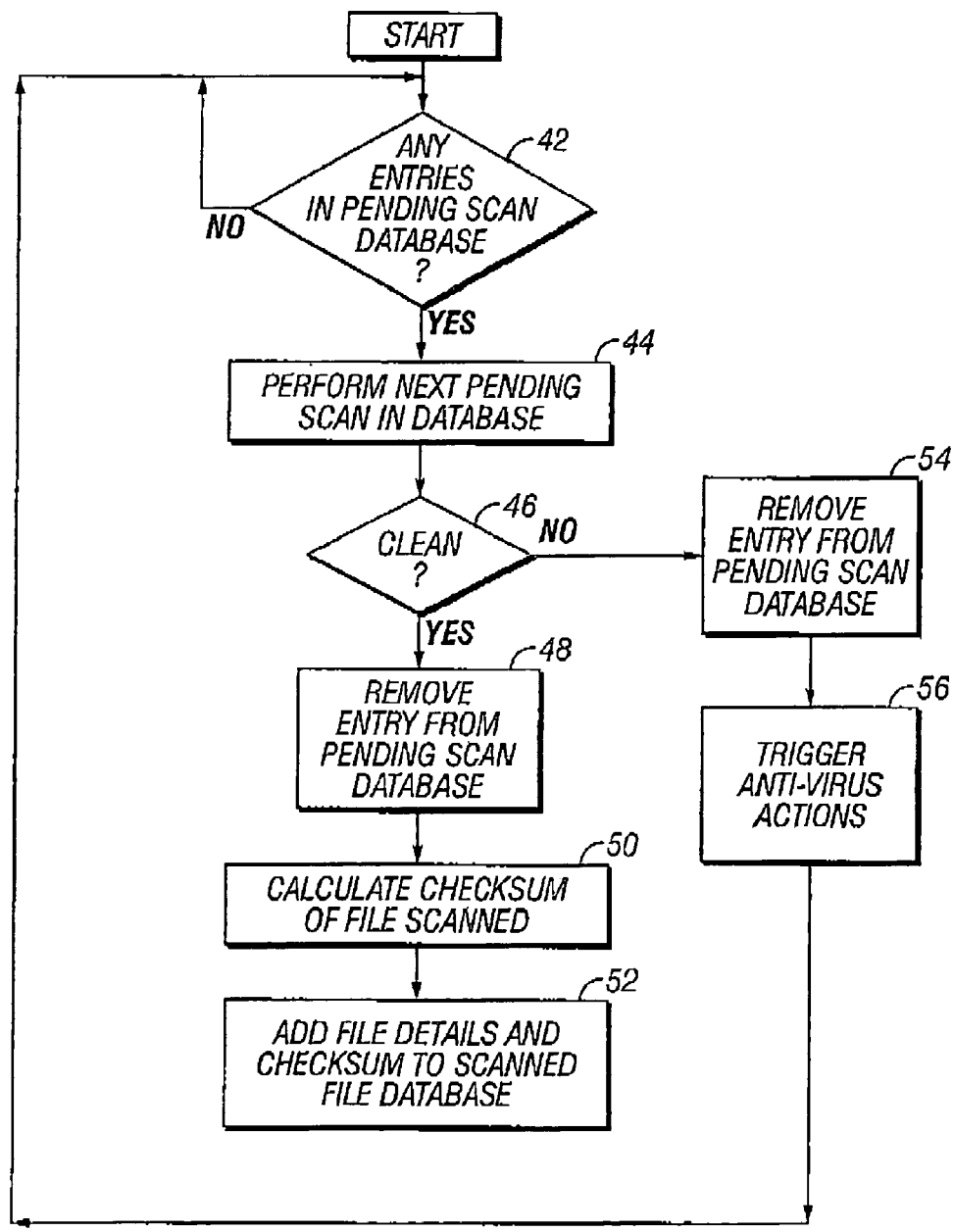
FIG. 3 is a flow diagram schematically illustrating background scanning operations.

FIG. 3 is a flow diagram illustrating the background scanning that is performed. It will be appreciated that background tasks in themselves and the way in which processing resources are allocated to tasks of different priorities are known. It is also known that certain tasks can be allocated a priority that varies with time, such as being a low priority task during normal working hours, but a high priority task at the evenings and weekends.

In the process illustrated in FIG. 3, step 42 serves to check that there are entries within the pending scan database and waits for such entries to be present. When entries are present within the pending scan database, then step 44 serves to select the next pending scan to be performed, typically this may be selected in dependence upon the order in which the files were placed within the pending scan database, or alternatively in dependence upon some algorithm attempting to estimate the likelihood of a read request for that file occurring. The scan is performed using the scanning engine 10 and the virus definition data 12. The test at step 46 determines whether or not the computer file scanned is clean. If the file is clean, then step 48 removes the corresponding entry from the pending scan database 14. Step 50 then calculates a checksum for the computer file that has just been scanned. Step 52 writes the file name details and the checksum value (as well as other possible details) into the scanned file database 16 before returning processing to step 42.

If the test at step 46 indicated that the computer file scanned for malware was not clean, then step 54 removes the corresponding entry from the pending scan database 14 and anti-virus actions are triggered at step 56, in a similar way to step 36 of FIG. 2, prior to processing returning to step 42.

Figure 4:
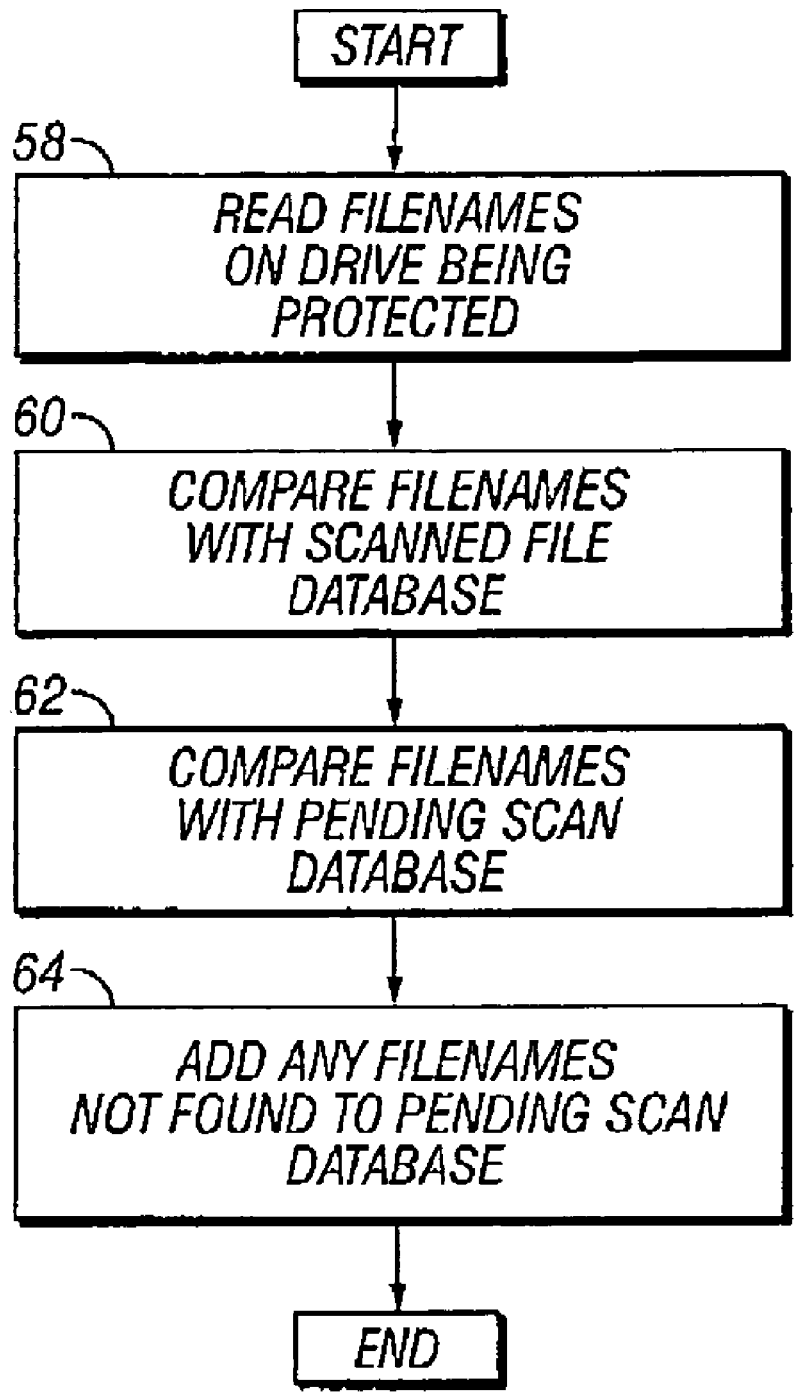
FIG. 4 is a flow diagram schematically illustrating the processing performed upon initialisation.

FIG. 4 illustrates processing operations performed upon initialisation/startup of the scanning technique described above. Such processing may be performed when the software is first installed, when the software is started after a period of not being active, or periodically as a way of checking the integrity of the system.

At step 58 the system reads the file names of all of the files stored upon the data storage devices protected, or the portions thereof being protected. At step 60 these read file names are compared with the file names stored within the scanned filed database 16. At step 62 the read file names are compared with the file names within the pending scan database 14. At step 64 any file names for which a match was not found at steps 60 and 62 are added to the pending scan database 14. Such non-matching files require scanning as they may contain malware. Such non-matching files may be all the files on a particular storage device 6 when the system is first installed, or may represent those files written to the storage device 6 while the scanner was inactivated upon a system for which the scanner was installed.

Figure 5:
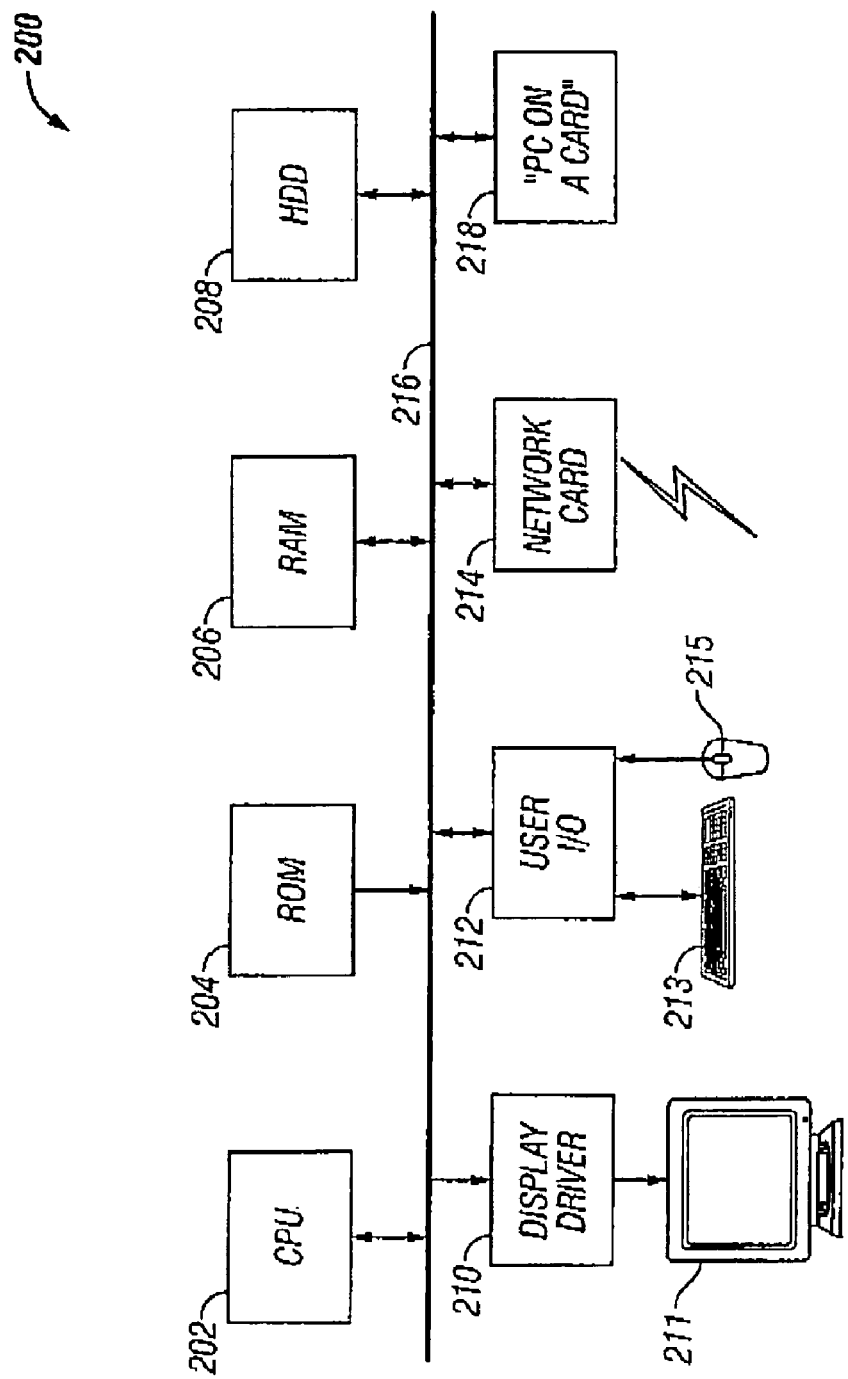
FIG. 5 is a diagram schematically illustrating the architecture of a general purpose computer for performing malware scanning.

FIG. 5 schematically illustrates a general purpose computer 200 of the type that may be used to implement the above described techniques. The general purpose computer 200 includes a central processing unit 202, a random access memory 206, a read only memory 204, a network interface card 214, a hard disk drive 208, a display driver 210 and monitor 211 and a user input/output circuit 212 with a keyboard 213 and mouse 215 all connected via a common bus 216. In operation the central processing unit 202 will execute computer program instructions that may be stored in one or more of the random access memory 206, the read only memory 204 and the hard disk drive 208 or dynamically downloaded via the network interface card 214. The results of the processing performed may be displayed to a user via the display driver 210 and the monitor 211. User inputs for controlling the operation of the general purpose computer 200 may be received via the user input output circuit 212 from the keyboard 213 or the mouse 215. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium for controlling operation of a computer to detect malware, said computer program product comprising:
    pending scan database code operable to maintain a pending scan database storing data identifying computer files that have been written to a data storage device and for which a scan for malware has yet to be performed;
    scanning code operable as a low priority task within a multitasking environment to conduct malware scanning upon computer files identified within said pending scan database as having been written to the data storage device and for which the scan for malware has yet to be performed; and
    file read code operable in response to a read request for a computer file identified within said pending scan database to trigger said scanning code to scan said computer file as a high priority task with a first priority that is higher than a second priority of said low priority task, before permitting read access to said computer file;
    wherein an order of said computer files identified within said pending scan database being scanned is based on an algorithm that estimates a likelihood of said read request being performed on each computer file.

2. The computer program product as claimed in claim 1, further comprising file write code operable as a computer file is written to a storage device to add data identifying said computer file to said pending scan database.

3. The computer program product as claimed in claim 1, further comprising scanned file database code operable to maintain a scanned file database storing data identifying computer files that have been scanned for malware.

4. The computer program product as claimed in claim 3, wherein said data identifying computer files that have been scanned for malware includes checksum data derived from said computer files that were scanned.

5. The computer program product as claimed in claim 4, wherein said file read code is further operable in response to said read request for said computer file to detect if said computer file is within said scanned file database, to recalculate a checksum value for said computer file, and to determine that said recalculated checksum value matches a stored checksum within said scanned file database before permitting said read request.

6. The computer program product as claimed in claim 3, further comprising initiation code operable upon startup to detect any computer files stored on a storage device not included within either said pending scan database or said scanned file database and to add such computer files to said pending scan database.

7. The computer program product as claimed in claim 1, wherein said malware comprises one or more of:
    a computer file infected with a computer virus;
    a Trojan;
    a banned computer file; and
    a computer file containing banned content.

8. The computer program product as claimed in claim 3, wherein only computer files determined to be clean from the malware scanning are stored in the scanned file database.

9. The computer program product as claimed in claim 1, wherein if said scanning code determines that said computer file is clean, said data identifying said computer file is removed from said pending scan database.

10. The computer program product as claimed in claim 1, wherein actions are triggered if said scanning code determines that said computer file is not clean.

11. The computer program product as claimed in claim 10, wherein said malware actions include at least one of file cleaning, file quarantining, file deletion, and alert message issuing.

12. The computer program product as claimed in claim 1, wherein said second priority of said low priority task is determined based on a predetermined time period.

13. A method for detecting malware, said method comprising the steps of:
    maintaining a pending scan database storing data identifying computer files that have been written to a data storage device and for which a scan for malware has yet to be performed;
    as a low priority task within a multitasking environment, conducting malware scanning upon computer files identified within said pending scan database as having been written to the data storage device and for which the scan for malware has yet to be performed; and
    in response to a read request for a computer file identified within said pending scan database triggering scanning of said computer file as a high priority task with a first priority that is higher than a second priority of said low priority task, before permitting read access to said computer file;
    wherein an order of said computer files identified within said pending scan database being scanned is based on an algorithm that estimates a likelihood of said read request being performed on each computer file.

14. The method as claimed in claim 13, further comprising the step of as a computer file is written to a storage device adding data identifying said computer file to said pending scan database.

15. The method as claimed in claim 13, further comprising maintaining a scanned file database storing data identifying computer files that have been scanned for malware.

16. The method as claimed in claim 15, wherein said data identifying computer files that have been scanned for malware includes checksum data derived from said computer files that were scanned.

17. The method as claimed in claim 16, further comprising the step of in response to said read request for said computer file, detecting if said computer file is within said scanned file database, recalculating a checksum value for said computer file, and determining that said recalculated checksum value matches a stored checksum within said scanned file database before permitting said read request.

18. The method as claimed in claim 15, further comprising the step of upon startup detecting any computer files stored on a storage device not included within either said pending scan database or said scanned file database and to add such computer files to said pending scan database.

19. The method as claimed in claim 13, wherein said malware comprises one or more of:
 a computer file infected with a computer virus;
 a Trojan;
 a banned computer file; and
 a computer file containing banned content.

20. Apparatus for detecting malware, said apparatus comprising:
 pending scan database logic operable to maintain a pending scan database storing data identifying computer files that have been written to a data storage device and for which a scan for malware has yet to be performed;
 scanning logic operable as a low priority task within a multitasking environment to conduct malware scanning upon computer files identified within said pending scan database as having been written to the data storage device and for which the scan for malware has yet to be performed; and
 file read logic operable in response to a read request for a computer file identified within said pending scan database to trigger said scanning logic to scan said computer file as a high priority task with a first priority that is higher than a second priority of said low priority task, before permitting read access to said computer file;
 wherein an order of said computer files identified within said pending scan database being scanned is based on an algorithm that estimates a likelihood of said read request being performed on each computer file.

21. Apparatus as claimed in claim 20, further comprising file write logic operable as a computer file is written to a storage device to add data identifying said computer file to said pending scan database.

22. Apparatus as claimed in claim 20, further comprising scanned file database logic operable to maintain a scanned file database storing data identifying computer files that have been scanned for malware.

23. Apparatus as claimed in claim 22, wherein said data identifying computer files that have been scanned for malware includes checksum data derived from said computer files that were scanned.

24. Apparatus as claimed in claim 23, wherein said file read logic is further operable in response to said read request for said computer file to detect if said computer file is within said scanned file database, to recalculate a checksum value for said computer file, and to determine that said recalculated checksum value matches a stored checksum within said scanned file database before permitting said read request.

25. Apparatus as claimed in claim 22, further comprising initiation logic operable upon startup to detect any computer files stored on a storage device not included within either said pending scan database or said scanned file database and to add such computer files to said pending scan database.

26. Apparatus as claimed in claim 20, wherein said malware comprises one or more of:
 a computer file infected with a computer virus;
 a Trojan;
 a banned computer file; and
 a computer file containing banned content.

* * * * *